United States Patent [19]

Giannelis et al.

[11] Patent Number: 5,554,670
[45] Date of Patent: Sep. 10, 1996

[54] METHOD OF PREPARING LAYERED SILICATE-EPOXY NANOCOMPOSITES

[75] Inventors: Emmanuel P. Giannelis, Ithaca, N.Y.; Phillip B. Messersmith, Clarendon Hills, Ill.

[73] Assignee: Cornell Research Foundation, Inc., Ithaca, N.Y.

[21] Appl. No.: 304,574

[22] Filed: Sep. 12, 1994

[51] Int. Cl.[6] ............... C08K 3/34; C08K 9/12; C08C 63/02

[52] U.S. Cl. .............. 523/209; 523/216; 525/523; 525/525; 525/533

[58] Field of Search ............... 528/106, 110, 528/111; 525/523, 533, 525; 523/216, 209

[56] References Cited

U.S. PATENT DOCUMENTS

| | | |
|---|---|---|
| 2,531,427 | 11/1950 | Hauser . |
| 2,966,506 | 12/1960 | Jordan . |
| 3,227,675 | 1/1966 | Papalos . |
| 3,252,757 | 5/1966 | Granquist . |
| 3,290,165 | 12/1966 | Iannicelli . |
| 3,537,994 | 11/1970 | House . |
| 3,567,680 | 3/1971 | Iannicelli . |
| 3,586,468 | 6/1971 | Sims et al. . |
| 3,666,407 | 5/1972 | Orelmann . |
| 3,671,190 | 6/1972 | Neumann . |
| 3,764,456 | 10/1973 | Woodhans . |
| 3,844,978 | 10/1974 | Hickson . |
| 3,844,979 | 10/1974 | Hickson . |
| 3,852,405 | 12/1974 | Granquist . |
| 3,855,147 | 12/1974 | Granquist . |
| 3,974,125 | 8/1976 | Oswald et al. . |
| 4,081,496 | 3/1978 | Finlayson . |
| 4,190,686 | 2/1980 | Muis . |
| 4,216,188 | 8/1980 | Shabtai .................... 423/118 |
| 4,454,237 | 6/1984 | Hoda et al. . |
| 4,455,382 | 6/1984 | Wu . |
| 4,465,542 | 8/1984 | Furihata . |
| 4,480,060 | 10/1984 | Hoda et al. . |
| 4,667,158 | 6/1987 | Tso et al. . |
| 4,690,868 | 9/1987 | Rice . |
| 4,739,007 | 4/1988 | Okada et al. . |
| 4,789,403 | 12/1988 | Rice . |
| 4,810,734 | 3/1989 | Kawasumi et al. . |
| 4,889,885 | 12/1989 | Usuki et al. . |
| 4,990,405 | 2/1991 | Bohrn et al. . |
| 5,061,744 | 10/1991 | Ogitani et al. . |
| 5,151,155 | 9/1992 | Cody et al. . |

OTHER PUBLICATIONS

Wang et al., 1994, Chemistry of Materials 6:468–74.
Halpin et al., 1976, Polym. Eng. Sci. 16:344.

*Primary Examiner*—D. R. Wilson
*Attorney, Agent, or Firm*—Klauber & Jackson

[57] ABSTRACT

An epoxy-silicate nanocomposite is prepared by dispersing an organically modified smectite-type clay in an epoxy resin together with diglycidyl ether of bisphenol-A (DGEBA), and curing in the presence of either nadic methyl anhydride (NMA), and/or benzyldimethyl amine (BDMA), and/or boron trifluoride monoethylamine (BTFA) at 100°–200° C. Molecular dispersion of the layered silicate within the crosslinked epoxy matrix is obtained, with smectite layer spacings of 100 Å or more and good wetting of the silicate surface by the epoxy matrix. The curing reaction involves the functional groups of the alkylammonium ions located in the galleries of the organically modified clay, which participate in the crosslinking reaction and result in direct attachment of the polymer network to the molecularly dispersed silicate layers. The nanocomposite exhibits a broadened $T_s$ at slightly higher temperature than the unmodified epoxy. The dynamic storage modulus of the nanocomposite was considerably higher in the glassy region and very much higher in the rubbery plateau region when compared to such modulus in the unmodified epoxy.

10 Claims, 11 Drawing Sheets

METHOD OF PREPARING LAYERED SILICATE-EPOXY NANOCOMPOSITES

FIELD OF INVENTION

This invention relates generally to mineral-polymer composite materials, and more specifically relates to an epoxy-smectite nanocomposite and method of preparing same.

BACKGROUND OF INVENTION

Particulate minerals such as kaolins, talcs, calcium carbonate, calcium sulfate and various micas have long been utilized as inert extenders or fillers in polymers or similar matricies. Aside from providing economic advantages in extending the more costly polymeric material, such fillers serve in many instances to improve the properties of the resultant plastics with respect to such parameters as thermal expansion coefficient, stiffness and creep resistance.

It is also well known in the prior art to render fillers of the foregoing type of increased compatability with the polymer matrix to improve the interfacial adhesion of the mineral to the matrix. Thus, for example, in Papalos, U.S. Pat. No. 3,227,675, kaolin clays are described, the surfaces of which are modified with organofunctional silanes. The kaolin clays so modified are used as fillers for natural and synthetic rubbers and the like. Additional references of this type include Iannicelli, U.S. Pat. Nos. 3,290,165 and 3,567,680. Similarly, in U.S. Pat. No. 4,789,403, a method is disclosed for producing a layered lattice silicate which is surface modified with an organic material. The layered lattice silicate is contacted with an organic monomer, comonomers, or a pre-polymer, and surface polymerization or reaction in situ is effected in the presence of a gaseous hydrogen atmosphere. Among the organic monomers that can be used in the process are various precursors of nylon.

More recently, processes have been disclosed which are said to be useful in producing composite materials composed of a polymer and a smectite-type clay mineral, with the mineral being connected to the polymer through ionic bonding. For example, in Kawasumi et al., U.S. Pat. No. 4,810,734 a process is disclosed wherein a smectite-type clay mineral is contacted with a swelling agent in the presence of a dispersion medium thereby forming a complex. The complex containing the dispersion medium is mixed with a monomer, and the monomer is then polymerized. The patent states that the swelling agent acts to expand the interlayer distance of the clay mineral, thereby permitting the clay mineral to take monomers into the interlayer space. The swelling agent is a compound having a onium ion and a functional ion capable of reacting and bonding with a polymer compound. Among the polymers utilizable are polyamide resins, vinyl polymers, thermosetting resins, polyester resins, polyamide resins and the like. Related disclosures are found in U.S. Pat. Nos. 4,739,007 and 4,889,885.

The swelling agents used in the Karasumi et al. and related patents cited above, technically qualify as organoclays. In the present invention as well, organically modified smectite-type clays, hereinafter referred to as "organophilic" or "organoclays", are used as the mineral component of the composite. In general, organoclays represent the reaction product of a smectite-type clay with a higher alkyl containing ammonium compound (often a quaternary), and have long been known for use in gelling of organic liquids such as lubricating oils, linseed oil, toluene and the like and for use as theological additives in a variety of organic based liquid systems and solvents. The general procedures and chemical reactions pursuant to which these organoclays are prepared are well known. Thus under appropriate conditions the organic compound which contains a cation will react by ion exchange with clays which contain a negative layer lattice and exchangeable cations to form the organoclay products. If the organic cation contains at least one alkyl group containing at least ten carbon atoms then the resultant organoclays will have the property of swelling in certain organic liquids. Among the prior art patents which discuss at length aspects of the preparation and properties of organoclays are U.S. Pat. Nos. 2,53 1,427, 2,966,506, 3,974,125, 3,537,994, and 4,081,496.

As utilized in the present specification, the term "smectite" or "smectite-type clays" refers to the general class of clay minerals with expanding crystal lattices, with the exception of vermiculite. This includes the dioctahedral smectites which consist of montmorillonite, beidellite, and nontronite, and to the trioctahedral smectites, which includes saponite, hectorite, and sauconite. Also encompassed are smectite-clays prepared synthetically, e.g. by hydrothermal processes as disclosed in U.S. Pat. Nos. 3,252,757; 3,586, 468; 3,666,407; 3,671,190; 3,844,978; 3,844,979; 3,852, 405; and 3,855,147.

The phase dispersions exhibited by the composite materials thus far discussed are relatively coarse, and differ materially in this respect from nanocomposites. The latter are a relatively new class of materials which exhibit ultrafine phase dimensions, typically in the range 1–100 nm. Experimental work on these materials has generally shown that virtually all types and classes of nanocomposites lead to new and improved properties when compared to their micro- and macrocomposite counterparts.

While the number of nanocomposites based on smectite-type clays and linear thermoplastics is growing, little work has been devoted to crosslinked polymeric systems such as epoxies. Recent reports of particulate-based epoxy composites suggest that the dimensional stability, conductivity, mechanical, thermal and other properties may be modified due to the incorporation of filler particles within the epoxy matrix. For the most part, however, the improvements in properties observed with these conventionally prepared composites are modest when compared (on an equal volume basis of particulate filler) to those that have been established for various polymer-ceramic nanocomposites.

Previous work by the present inventors on poly(imide), and poly($\epsilon$-caprolactone) have demonstrated the feasibility of dispersing molecular silicate layers within a macromolecular matrix, which results in significant improvements in physical properties with only modest particulate contents (<10% by volume).

Wang and Pinnavaia have recently reported delamination of an organically modified smectite in an epoxy resin by heating an onium ion exchanged form of montmorillonite with epoxy resin to temperatures of 200°–300° C. *Chemistry of Materials*, vol. 6, pages 468–474 (April, 1994). X-ray and electron microscopy studies of the composite suggested delamination of the silicate layers, although phase segregation of the polyether-coated smectite from the epoxy matrix was observed. Furthermore, the product of the high temperature curing reaction is an intractable powder rather than a continuous solid epoxy matrix.

In accordance with the foregoing, it may be regarded as an object of the present invention to provide a smectite-epoxy nanocomposite which can be mixed, applied in various forms (e.g. as adhesive films, coatings, or castings), and cured by conventional means;

A further object of the invention is is to synthesize a polymer-ceramic nanocomposite in which smectite-type organoclays individual layers with a thickness of 10 Å and a high aspect ratio (100–1000) are dispersed within a crosslinked epoxy matrix.

A yet further object of the invention, is to provide a process for the preparation of a smectite-epoxy nanocomposite which fulfills the above requirements, and is processed using conventional epoxy curing agents at temperatures significantly lower than those previously utilized.

A still further object of the invention, is to provide a process for preparing a smectite-epoxy composite, in which the resulting composite exhibits molecular dispersion of the silicate layers in the epoxy matrix, good optical clarity, and significantly improved dynamic mechanical properties compared to the unmodified epoxy.

SUMMARY OF THE INVENTION

Now in accordance with the present invention, a method for preparing an epoxy-smectite-type clay nanocomposite is provided, according to which there is dispersed in an epoxy resin a dry smectite-type-clay which has been modified to an organoclay by ion exchange with an alkyl ammonium salt, together with diglycidyl ether of bisphenol A (DGEBA). The positive ion of the salt is of the general form $^+NH_3R_1$, $^+NH_2R_2R_3$, $^+NHR_4R_5R_6$, or $^+NR_7R_8R_9R_{10}$, wherein $R_1$ through $R_{10}$ are organic radicals; and wherein $R_1$, at least one of $R_2$ and $R_3$, at least one of $R_4$, $R_5$, and $R_6$, and at least one of $R_7$, $R_8$, $R_9$ and $R_{10}$, contain a functional group capable of reacting and bonding with the epoxy upon crosslinking of same, such as hydroxy or epoxy, or carboxylic. Preferably an ammonium salt is used which has at least one alkyl ammonium chain having a terminal hydroxyl group. A particularly preferred ammonium salt comprises a bis(2-hydroxyethyl)methyl tallow alkyl ammonium salt. The mixture is cured in the presence of a curing agent which either cross-links the DGEBA in the presence of the organoclay, reacts directly with the organoclay, or catalyzes the crosslinking reaction between the organoclay and DGEBA. This enables dispersion of the organoclay in the dry state, and enables curing of the nanocomposite to occur at much lower temperatures than in the prior art. In addition, formation of chemical bonds between the crosslinked network and the silicate nanoparticles results in direct attachment of the epoxy matrix to the silicate layers, thereby maximizing adhesion between the two phases. Curing is typically carried out at temperatures in the range of 100° to 200° C. The smectite most preferable for use in the invention is montmorillonite, the structure of which consists of layers made up of one octahedral alumina sheet sandwiched between two tectrahedral silica sheets. The curing agent may be selected from one or more members of the group consisting of nadic methyl anhydride (NMA), benzyldimethylamine (BDMA), and boron trifluoride monoethylamine (BTFA).

DESCRIPTION OF PREFERRED EMBODIMENTS

The synthesis procedure used for nanocomposite preparation involves dispersion of the organoclay in a suitable monomer, followed by polymerization. Under proper conditions delamination of the organoclay into individual silicate layers occurs, which ultimately become dispersed within the macromolecular matrix. In a typical procedure mixing of the organoclay and DGEBA is carried out at temperatures in the range of 20° to 150° C., followed by sonication, addition of curing agent, and curing of the network at a prescribed set of temperatures. Initial mixing of the organoclay and DGEBA is more preferably performed at about 90° C. to ensure low resin viscosity. Following addition of small amounts of the clay (0.1 to 10% by weight), the resin viscosity is only slightly increased. However, samples sonicated briefly (1–2 minutes) experience a significant increase in resin viscosity at relatively low shear rates while turning from opaque to semi-transparent during sonication. Organoclay loadings above about 10% (w/w) begin to result in strong gel formation during sonication, even after reheating to temperatures at or above 100° C. The observed increase in resin viscosity following sonication may be due to the dispersion of high aspect ratio (100–1000) silicate layers within the epoxy resin and is due to formation of a so-called "house of cards" structure, in which edge-to- edge and edge-to-face interactions between dispersed layers form percolation structures. Similar rheological changes have been observed when organoclays are dispersed in various organic media and attributed to the formation of the "house-of-cards" structure.

The invention is further illustrated by the following Example, which is to be considered as illustrative and not delimiting of the invention otherwised disclosed:

EXAMPLE

Synthesis of Nanocomposite Samples

The organoclay used in this Example was prepared by Southern Clay Products, Inc. of Gonzales, Tex. by an ion-exchange reaction from Na-montmorillonite and bis(2-hydroxyethyl) methyl tallow-alkyl ammonium chloride (Ethoquad T/12, Akzo Chemicals) as shown in equation 1, (1)

where R' is predominantly an octadecyl chain with smaller amounts of lower homologues (approximate composition: $C_{18}$ 70%, $C_{16}$ 25% and $C_{14}$ 4% and $C_{12}$ 1%) and R" is a methyl group. The dry organoclay powder was added with stirring to diglycidyl ether of bisphenol A (DGEBA, Dow Chemical's DER 332, epoxide equivalent weight=178) and cured by addition of either nadic methyl anhydride (NMA, Aldrich), boron trifluoride monoethylamine (BTFA, Aldrich), benzyldimethylamine (BDMA, Aldrich), or methylene dianiline (MDA, Aldrich). The amount of curing agent used for each formulation was as follows: DGEBA/NMA: 87.5 parts NMA per hundred resin (phr), with or without 1.5 phr BDMA. DGEBA/BDMA: 1.5–10 phr BDMA. DGEBA/BTFA: 3 phr BTFA. DGEBA/MDA: 27 phr MDA. Organoclay/DGEBA mixtures were held at 90° C. with stirring for one hour, then sonicated for 1–2 minutes while hot using a Fisher Model 300 Sonic Dismembrator (Fisher Scientific, Itasca, Ill.). Following sonication samples were cooled, curing agent was added with thorough mixing, and then loaded into disposable syringes. Samples were centrifuged in the syringes for 30 seconds at 3000 rpm to remove bubbles, and then dispensed into rectangular teflon molds with dimensions 20 mm by 10 mm by 1.5 mm thick, or casted as free-standing films with thicknesses of 0.1–0.3 mm. All samples were cured at 100° C. for 4 hours, 150° C. for 16 hours, and 200° C. for 12 hours (in vacuo).

Characterization of Nanocomposite

X-ray diffraction (XRD) experiments were performed directly on the nanocomposite samples using a Scintag Pad X diffractometer with Cu (=1.54 Å) or Cr (=2.29 Å) irradiation. In-situ, hot-stage XRD experiments were conducted using a special thermal attachment which allowed samples to be heated to a number of different temperatures without removing the sample from the diffractometer. Samples were ramped at 10° C./min between the set temperatures, and scanned after a 10 minute isothermal equilibration. The exothermic epoxy curing reaction was followed by differential scanning calorimetry (DSC) using a du Pont 9900 thermal analyzer. Spectra were obtained under flowing nitrogen at a scanning rate of 10° C./min. In-situ infrared curing studies were performed on a Mattson Galaxy 2020 Series FT-IR using a programmable variable temperature heating cell (Model HT-32, Spectra-Tech, Inc.). Spectra were collected at a resolution of 4 cm$^{-1}$. Composite microstructure was imaged using transmission electron microscopy (TEM) on carbon coated 100 nm thick sections of the composite using a JEOL 1200EX transmission electron microscope at an accelerating voltage of 120 kV. Dynamic mechanical analyses (DMA) of the cured composite films were performed on a Rheovibron DDV-II-C viscoelastometer (Toyo Baldwin Co., Japan) operating at a driving frequency of 110 Hz and a temperature scanning rate of 1° C./min.

Delamination of Organoclays

Figure 1:
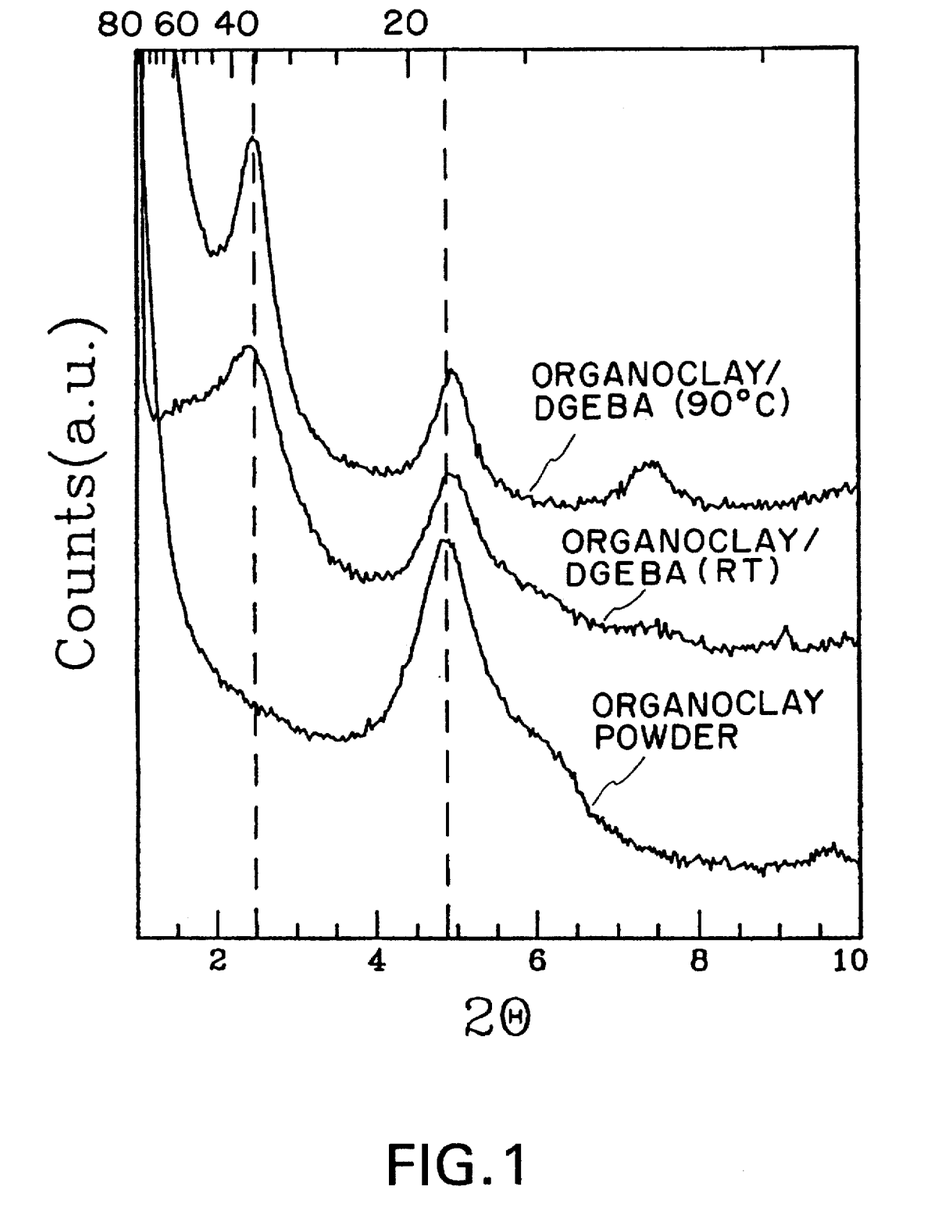
FIG. 1 depicts the XRD diffraction patterns of a dry organoclay powder and the uncured organoclay/DGEBA mixture.

XRD analysis was used to follow the progress of organoclay dispersion during mixing with DGEBA and subsequent curing reactions. FIG. 1 shows the XRD patterns of the dry organoclay and the uncured organoclay/DGEBA mixture. The top scan was obtained at room temperature following heating of the organoclay/DGEBA mixture at 90° C. for one hour. The XRD pattern of the organoclay powder shows a primary silicate (001) reflection at 2 =4.8°, with a low intensity shoulder at roughly 2=5.8°. The main silicate reflection in organoclay corresponds to a layer d-spacing of 17 Å which represents an increase of approximately 7 Å from the van der Waals gap of Na-montmorillonite. Following mixing of the organoclay and DGEBA at room temperature, an additional reflection centered at 2=2.5° emerges which corresponds to intercalated organoclay/DGEBA. As is known, organoclays can readily intercalate various small organic molecules from either the vapor or liquid phase. The second peak at 2=5° corresponds to the coexistence of unintercalated ($d_{(001)}$=17 Å) and intercalated ($d_{(002)}$=17.5 Å) organoclay. The persistence of some unintercalated organoclay at room temperature can also be seen by the small remnant shoulder at 2=5.8°. In contrast, mixing of DGEBA and the organoclay at 90° C. results in only DGEBA intercalated organoclay ($d_{(001)}$=35 Å) with no residual organoclay peaks observed, as shown in the top trace of FIG. 1. The reflections observed at 2=2.5°, 4.9°, and 7.6° correspond to the (001), (002), and (003) reflections of the DGEBA intercalated phase, respectively. Further evidence for the presence of only intercalated organoclay/DGEBA comes from the disappearance of the organoclay shoulder at 2=5.8°, which is no longer masked by any of the silicate (001) reflections.

Figure 2:
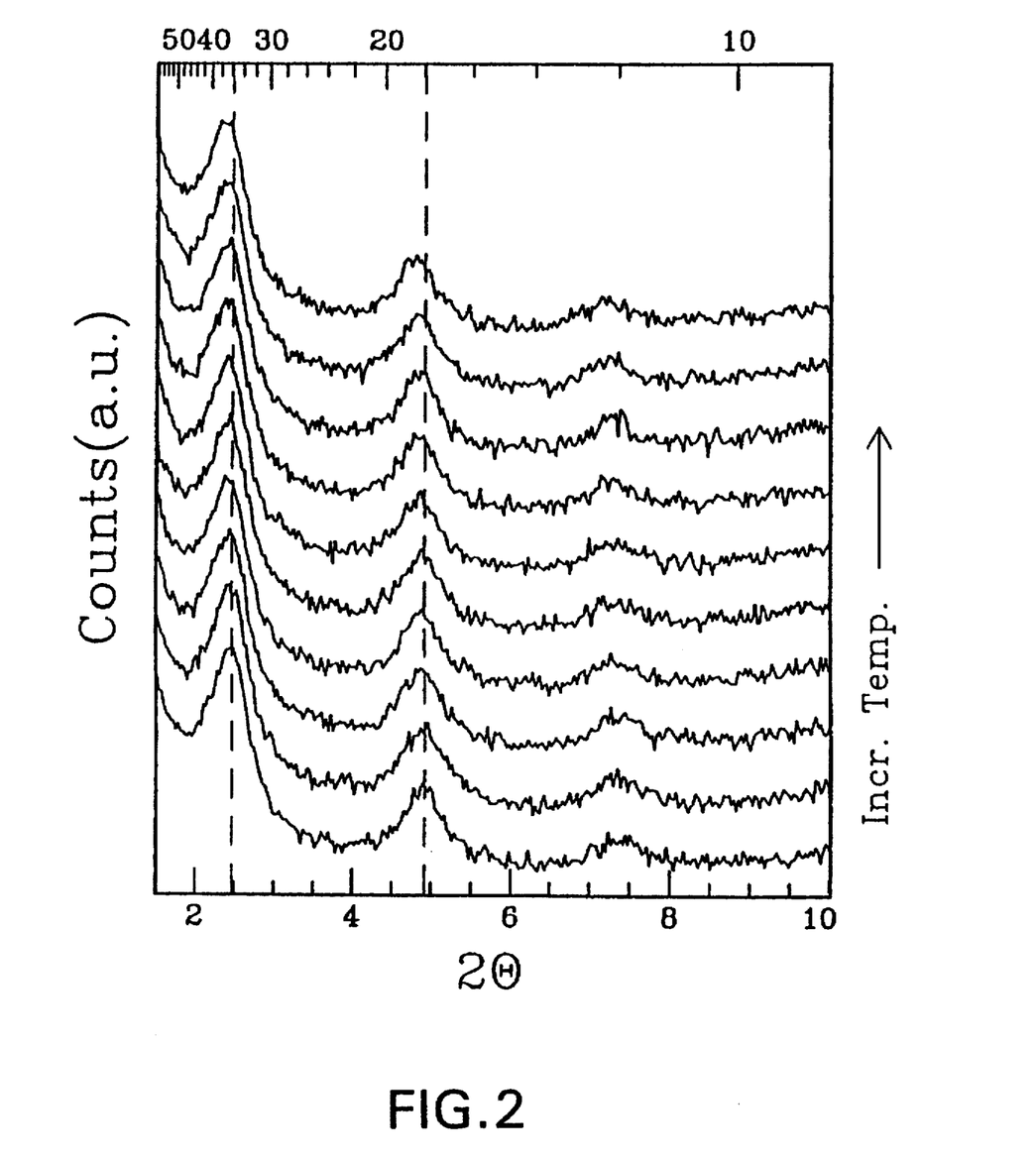
FIG. 2 depicts XRD patterns of organoclay/DGEBA mixture (4% MTS by volume) heated in situ to various temperatures. The spectra are displaced vertically for clarity, with scan temperatures (in °C.) from bottom to top as follows: 20; 50; 70; 90; 100; 110; 120; 130; 140; 150. The dashed lines indicate the location of the silicate (001) and (002) reflections at 20° C.

The XRD results discussed relate to resin samples cooled to room temperature after mixing at 90° C. and, therefore, do not necessarily represent the structures present at the mixing and curing temperatures. Dynamic high temperature, in-situ XRD experiments were used to determine the exact structure of the resin mixtures at elevated temperatures. Samples were prepared by mixing organoclays and DGEBA in a vial at 90° C., and cooling to room temperature before transferring to diffractometer chamber. Shown in FIG. 2 are a series of XRD scans of the organoclay/DGEBA mixture previously heated to 90° C. taken at various intervals between room temperature and 150° C. The low temperature scans exhibit three orders of reflections indicating the existence of DGEBA intercalated organoclay with $d_{(001)}$=36 Å. With increasing temperature a gradual increase in $d_{(001)}$ from 36 Å to approximately 38 Å was observed, although the constant intensity of the peaks suggests that little or no delamination occurs at or below 150° C. With the observation that intercalation but not delamination of the organoclay occurs in the presence of DGEBA, the inventors sought to identify potential epoxy curing agents which would produce both delamination of the organoclay and crosslinking of the epoxy resin. It was found that the choice of curing agent was critical in determining delamination and optical clarity.

Selection of Curing Agent

Figure 3:
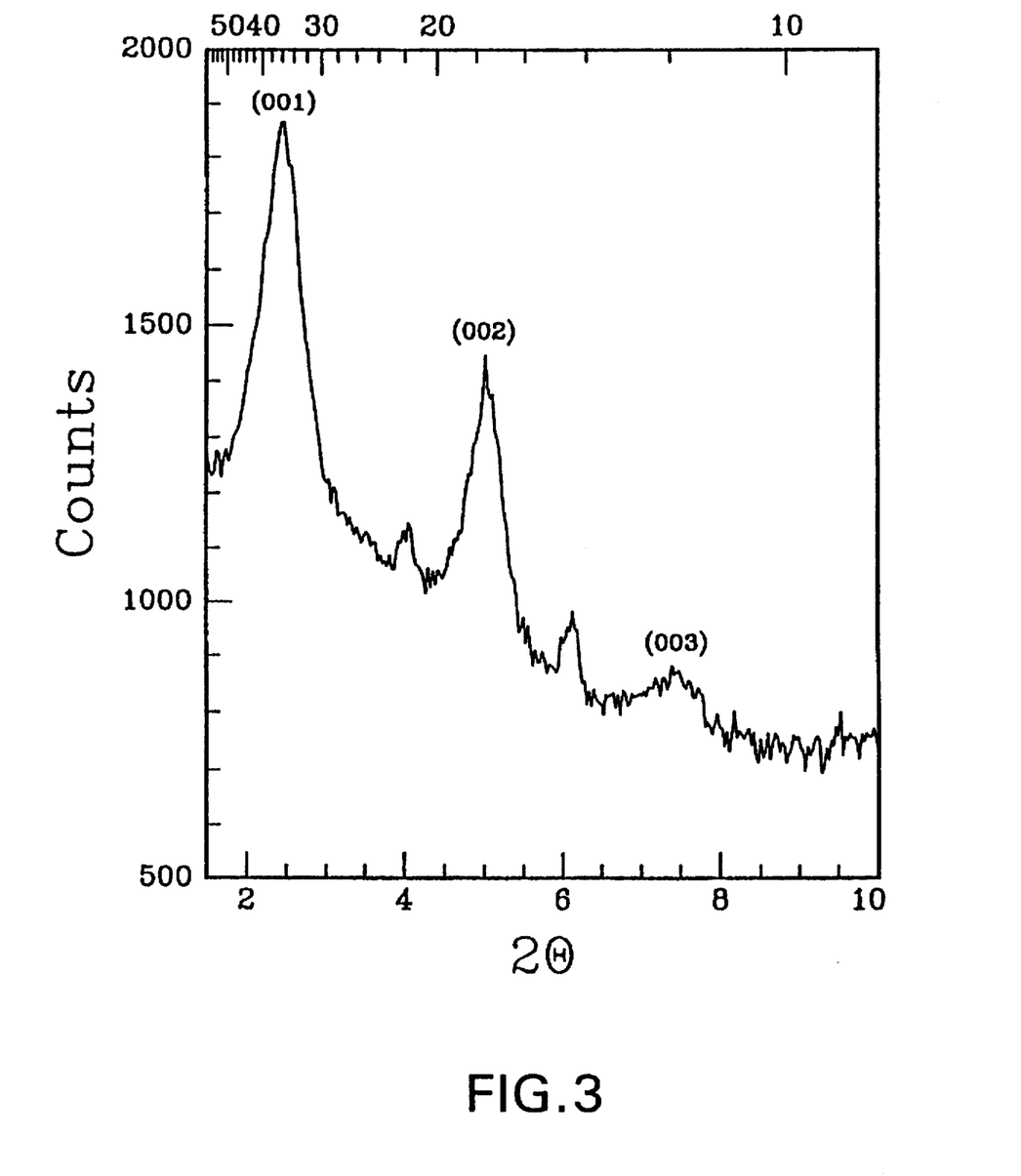
FIG. 3 is an XRD pattern of fully cured oganoclay/DGEBA/MDA composite containing 2% OMTS by volume. The silicate (001) reflection corresponds to a layer spacing of 36 Å.

A survey of common epoxy curing agents revealed that many curing agents studied resulted in little or no increase in layer separation, resulting in composites with silicate d-spacings of 30–40 Å or less. An example of this behavior is shown in FIG. 3 for methylene dianiline (MDA) cured organoclay/DGEBA composite. This composite was prepared by adding MDA to the organoclay/DGEBA mixture, which resulted in immediate clouding of the resin. Interestingly, all bifunctional primary and secondary amine curing agents used were found to have this effect and resulted in opaque composites, in contrast to the transparent composites following delamination of organoclay. One explanation for this behavior might be the bridging of the silicate layers by the bifunctional amine molecules, which prevents further expansion of the layers. Another possibility is that the N-H groups in the primary and secondary amines are sufficiently polar to cause reaggregation of dispersed silicate layers. Others have observed similar degellation (deexfoliation) of organoclays dispersed in organic solvents upon the addition of polar additives.

Figure 4:
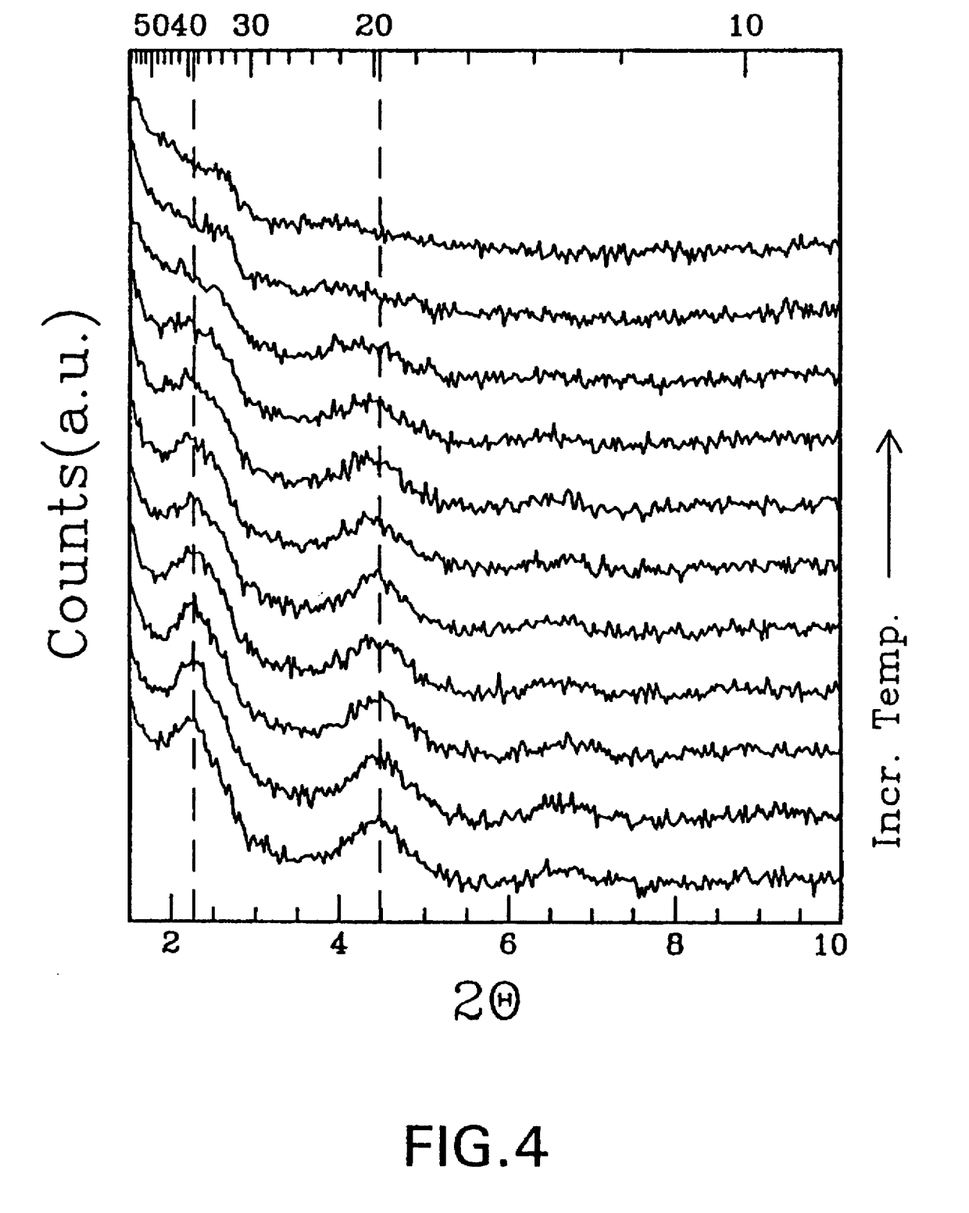
FIG. 4 depicts XRD patterns of organoclay/DGEBA/BDMA mixture (4% organoclay by volume) heated in situ to various temperatures. The spectra are displaced vertically for clarity, with scan temperatures (in C.°) from bottom to top as follows: 20; 40; 50; 60; 70; 80; 90; 100; 110; 130; 150. The dashed lines indicate the location of the silicate (001) and (002) reflections at 20° C.

Pursuant to the present invention, curing agents have now been found (NMA, BDMA, BTFA, and combinations thereof), which result in organoclay delamination during heating of the reaction mixture. Shown in FIG. 4 are in-situ XRD scans of the organoclay/DGEBA/BDMA mixture illustrating the delamination of the organoclay on heating from room temperature to 150° C. As before, the sample was prepared by mixing the organoclay and DGEBA in a vial at 90° C., cooling to room temperature, and mixing in BDMA immediately before transferring to the diffractometer chamber. The mixing of BDMA into the organoclay/DGEBA resin at room temperature resulted in an intercalated system with $d_{(001)}=39$ Å (slightly expanded from the $d_{(001)}=36$ Å observed with organclay/DGEBA). Furthermore, in contrast to what is observed in the absence of a curing agent, heating of the organoclay/DGEBA/BDMA mixture resulted in substantial attenuation of the peak at 2=2.3°. This peak almost disappeared by 150° C. (top of FIG. 4), with only a trace remaining at 2=3°. The virtual disappearance of the organoclay (001) reflections clearly indicates delamination of the organoclay has taken place.

Figure 5:
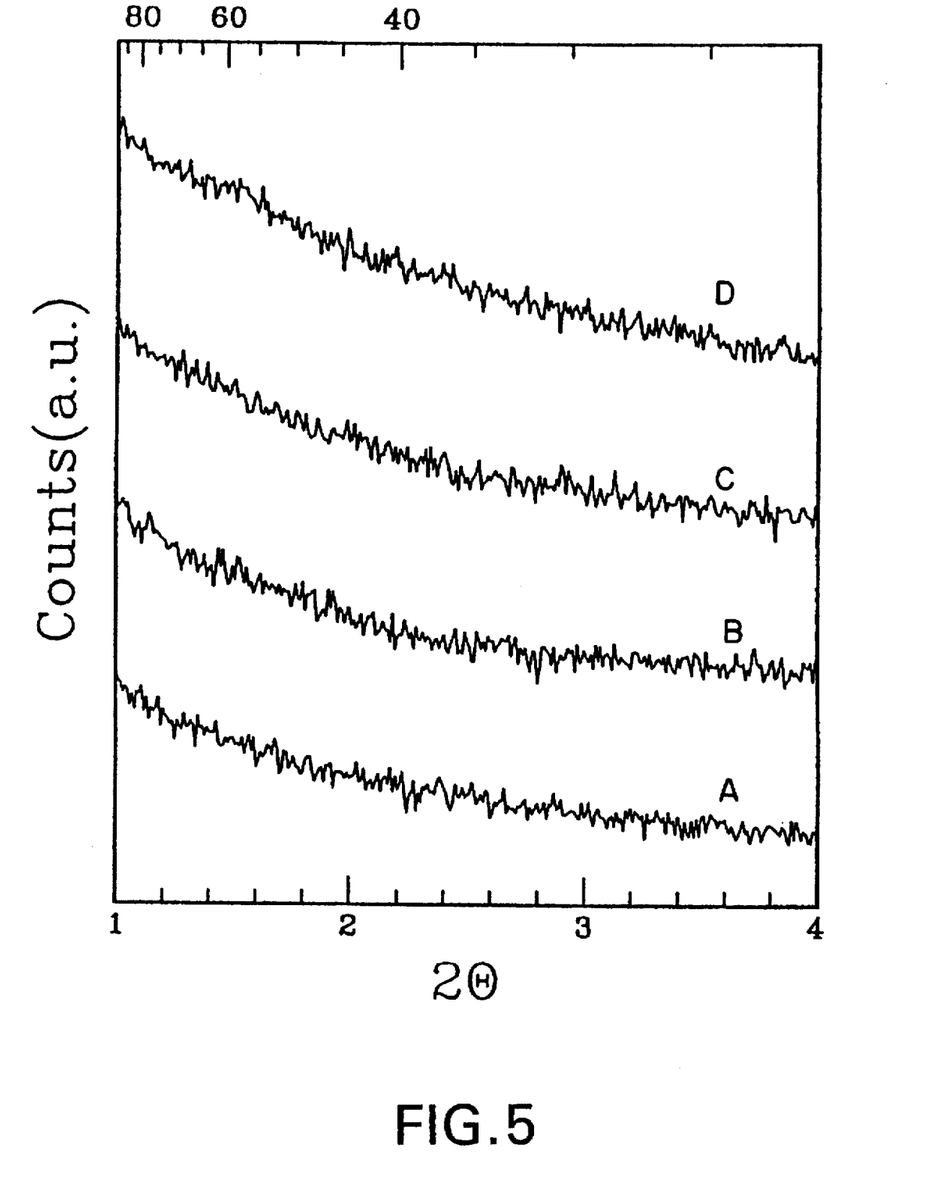
FIGS. 5 and 6 respectively depict XRD patterns of fully cured organoclay/DGEBA/BDMA and organoclay/DGEBA/NMA nanocomposites containing A: 0.4% B: 1.2% C: 2% D: 4% organoclay by volume. Spectra are displaced vertically for clarity.
Figure 6:
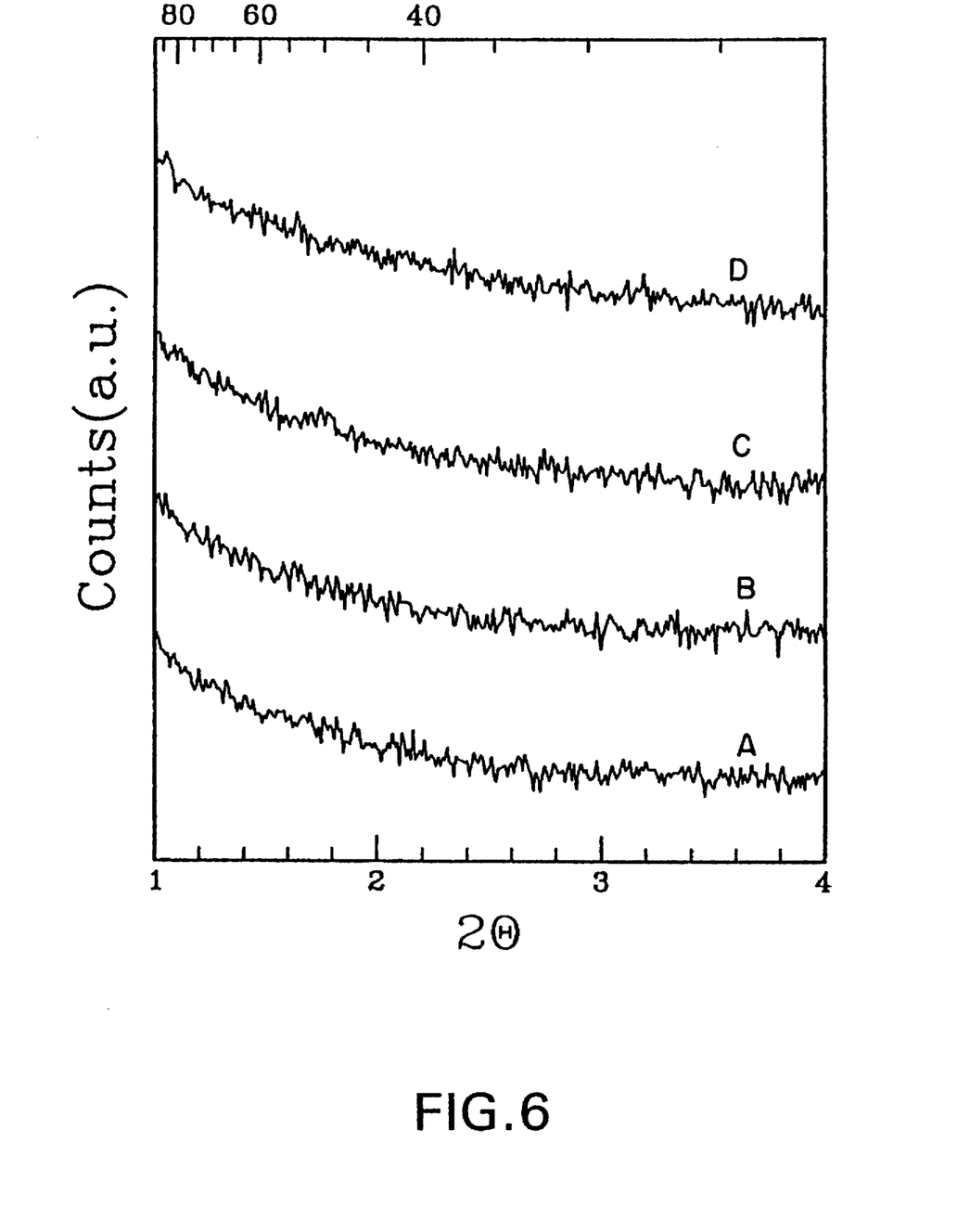
Figure 7A:
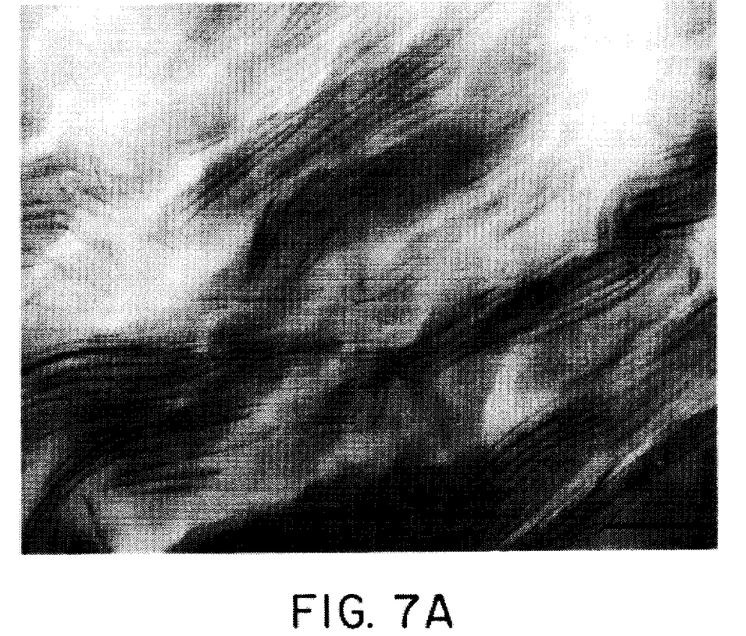
FIG. 7 shows TEM micrographs of thin sections of fully cured oganoclay/DGEBA/NMA nanocomposite containing 4% MTS by volume. Dispersed silicate layers are viewed edge-on and are clearly visible as dark lines of thickness approximately 10 Å, with 80–120 Å of epoxy matrix separating neighboring silicate layers. Scale bars=a) 100 nm and b) 10 nm.
Figure 7B:
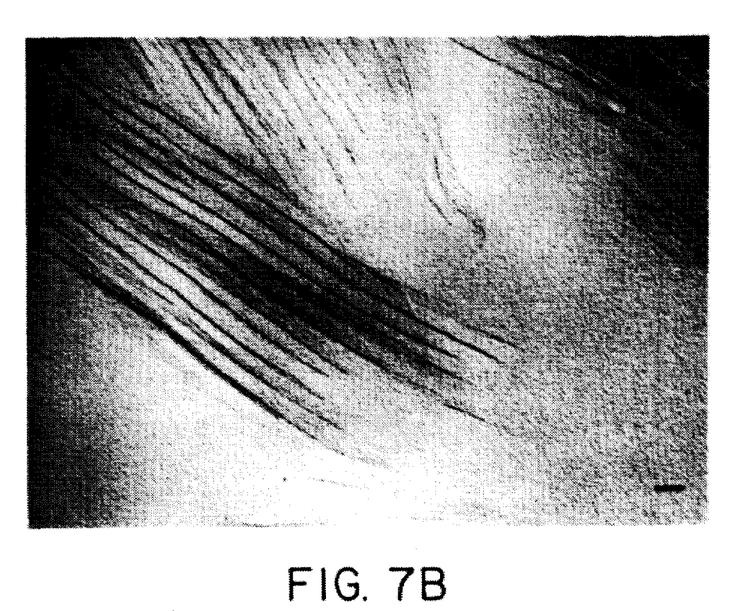

XRD analysis of completely cured nanocomposite samples also lacked silicate (001) reflections as shown in FIGS. 5 and 6 for organoclay/DGEBA/BDMA and organoclay/DGEBA/NMA, respectively. The absence of silicate (001) reflections in the cured nanocomposites shows that the delamination and dispersion of the silicate layers within the epoxy matrix is retained after complete curing of the epoxy. The exfoliation of the silicate was further confirmed using TEM. The micrographs of the BDMA-cured composite are shown in FIG. 7. These micrographs show quite clearly the existence of well-dispersed individual silicate layers (dark lines in FIG. 7) of thickness 1 nm embedded in the epoxy matrix. Some areas of the epoxy matrix appear to contain oriented collections of 5–10 parallel silicate layers. These domains of parallel layers are presumably remnants of organoclay tactoids, but with substantial expansion of the gallery beyond that corresponding to an intercalated silicate phase (see for example FIGS. 1 and 3). Close examination of these domains reveals consistent layer spacings of approximately 100 Å or more, with the intervening galleries between layers filled with crosslinked epoxy matrix. It is particularly interesting to note that the samples are mostly homogeneous with no phase separation between the silicate layers and the epoxy matrix. In fact, examination of the micrographs shows excellent apposition between the clay layers and the polymeric matrix.

Curing Reactions

In contrast to the work of Wang and Pinnavaia, where no curing agent was added, a curing agent is used in the present invention that either crosslinks DGEBA in the presence of the organoclay, reacts directly with the organoclay, or catalyzes the crosslinking reaction between organoclay and DGEBA. The benefits of this approach are first, curing of the nanocomposite occurs at much lower temperatures than reported previously, and second, formation of chemical bonds between the crosslinked network and the silicate nanoparticles results in direct attachment of the epoxy matrix to the silicate layers, thereby maximizing interfacial adhesion between the two phases.

Figure 8A:
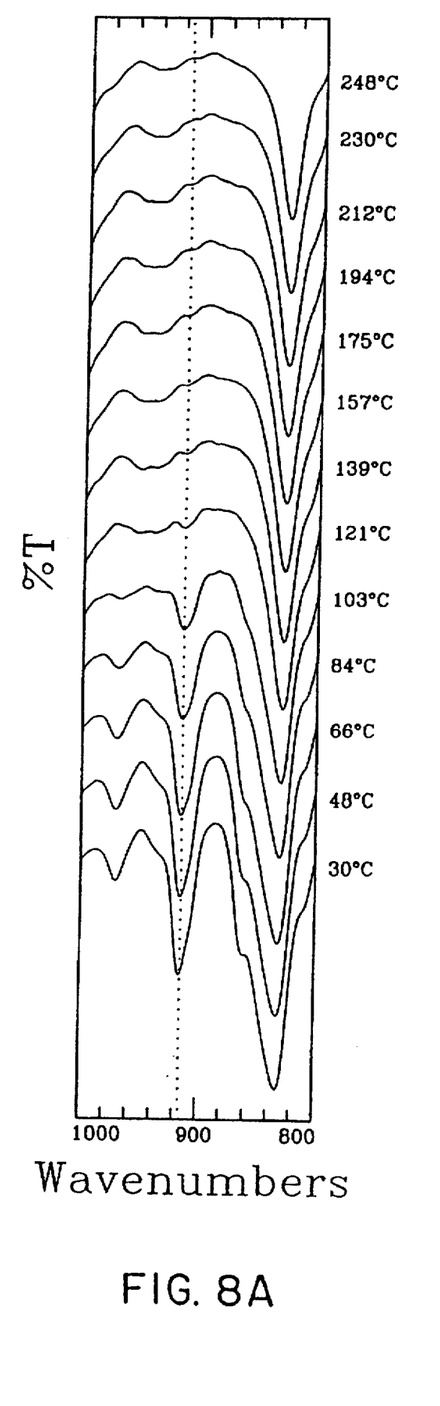
FIG. 8 depicts FT-IR spectra of A)DGEBA/BDMA and B)organoclay/DGEBA/BDMA (4 vol % MTS) resin mixtures taken at various temperatures during heating in situ at 0.5° C./min.
Figure 8B:
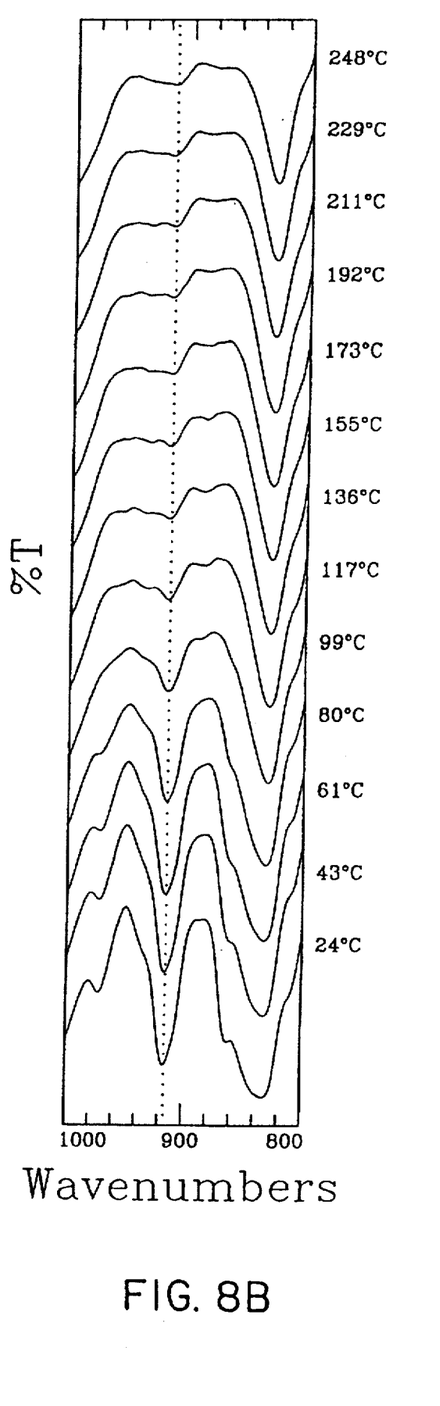

One preferred curing agent is BDMA, which can catalyze the homopolymerization of DGEBA, but is also capable of catalyzing the reaction between hydroxyl groups of the organoclay alkylammonium ions and the oxirane rings of DGEBA. Curing conditions of the composite resin may have an effect on the reaction mechanism. For example, increasing the temperature of the organoclay/DGEBA/BDMA and DGEBA/BDMA mixtures from 20° C. to 250° C. at slow rates (0.5° C./min) resulted in little difference in curing behavior between the composite and unmodified epoxy as shown by comparing the corresponding infrared spectra (FIG. 8). Both series of spectra show a gradual disappearance of the epoxy band at 918 cm$^{-1}$ at temperatures between 80° C. and 150° C. The extent of DGEBA reaction as given by the intensity of the epoxy peak is roughly equivalent for both compositions (organoclay/DGEBA/BDMA and DGEBA/BDMA).

Figure 9:
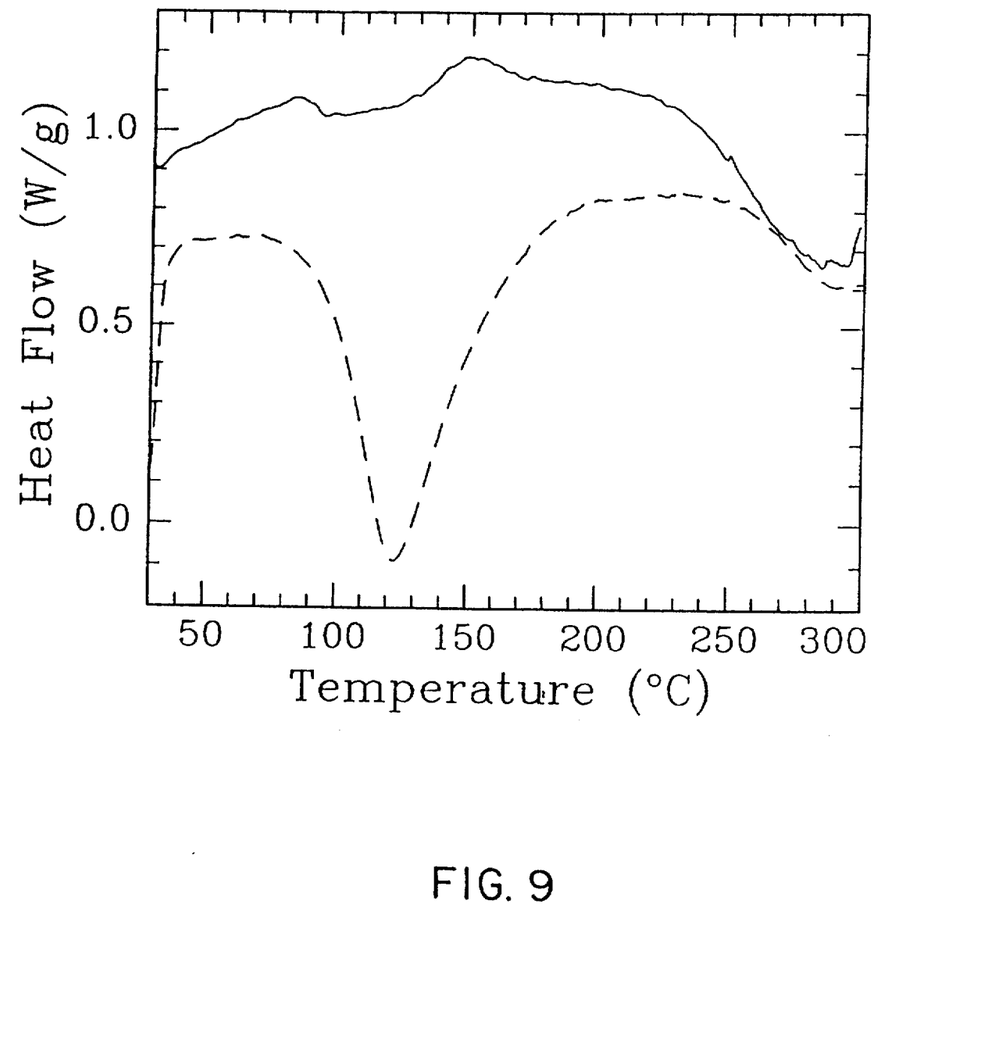
FIG. 9 depicts DSC curing scans of organoclay/DGEBA/BDMA (dashed line) and DGEBA/BDMA (solid line).

At higher heating rates, however, a difference in curing behavior is seen. FIG. 9 shows DSC scans of the organoclay/DGEBA/BDMA and DGEBA/BDMA curing reactions at a scanning rate of 10° C./min, showing a strong exotherm associated with curing between 100° and 150° C. for organoclay/DGEBA/BDMA. That the DSC scan of the DGEBA/BDMA mixture shows a considerably smaller exotherm over the same temperature range, suggests that the organoclay plays a catalytic role in the base-catalyzed homopolymerization of DGEBA, or that the reaction proceeds by an altogether different mechanism in the presence of the organoclay. One possibility as shown in eq. 2 involves the base-catalyzed oxirane ring-opening reaction between hydroxyl groups of the organoclay and DGEBA resulting in formation of I, an organoclay-glycidyl ether of bisphenol A oligomer.

I (MTS = smectite-type clay)

(2)

I can subsequently react with free DGEBA via similar base-catalyzed oxirane ring opening to build up the crosslinked epoxy network. It is interesting to note that the temperature at which curing occurs (approx. 100° C. as shown by the exotherm in FIG. 9) corresponds to the same temperature that delamination of the organoclay occurred (see FIG. 4). The temperature coincidence of curing and delamination makes intuitive sense, since delamination exposes the hydroxyl groups of the alkyl ammonium chains in the interlayer to DGEBA and BDMA.

Figure 10:
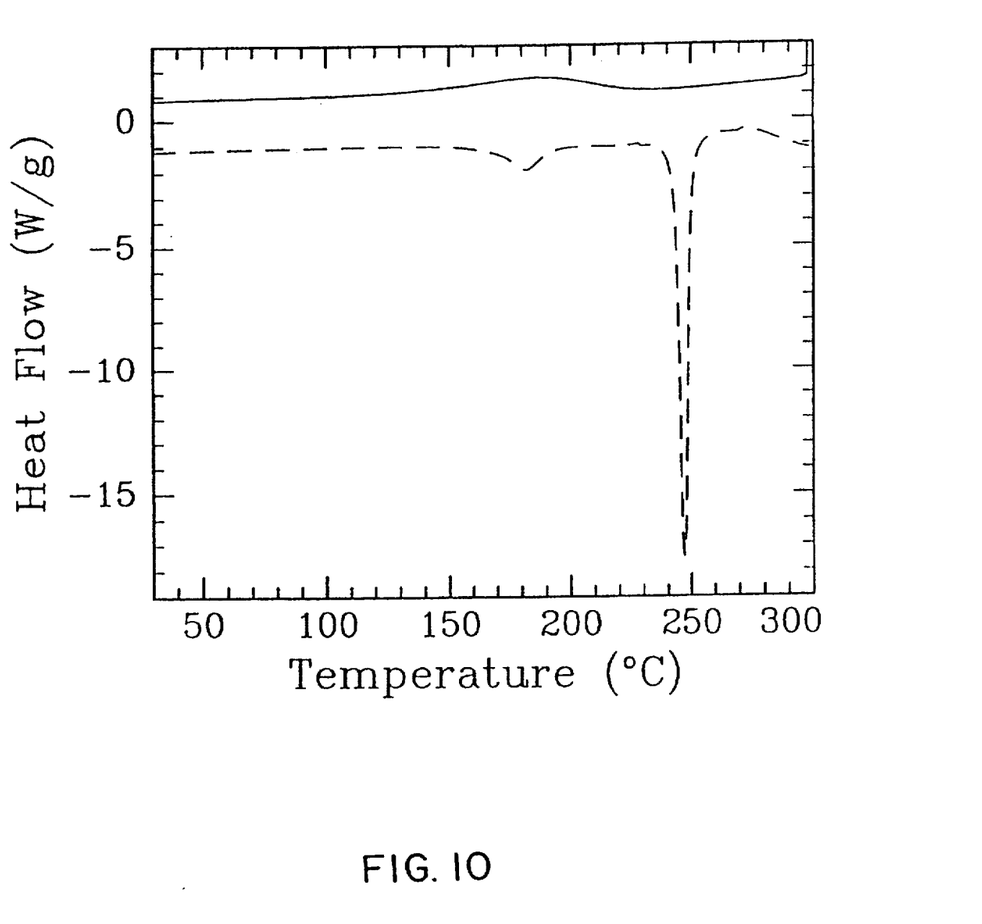
FIG. 10 shows DSC curing scans of organoclay/DGEBA/NMA (dashed line) and DGEBA/NMA (solid line)

The participation of the hydroxylated organoclay alkylammonium ion in tho curing reaction is more clearly illustrated with the organoclay/DGEBA/NMA system. Interestingly, full curing of the DGEBA/NMA mixture did not occur in the absence of organoclay, regardless of heating rate. Shown in FIG. 10 are DSC scans of the organoclay/DGEBA/NMA curing reaction. During dynamic curing of this formulation two distinct exotherms are observed; a weak one at 180° C. followed by a strong exotherm at 247° C. Although the complete sequence of reactions has not yet been determined, a possible sequence might first involve the reaction of organoclay hydroxyl groups with NMA to form the monoester, II, as shown in eq. 3.

(3)

Nascent carboxylic groups of II can subsequently react with the epoxide resulting in formation of the diester, III, according to eq. 4.

Further reaction of III with DGEBA results in epoxy network formation. This reaction sequence results in chemical bonding between the organoclay and the epoxy network. It is clear from the data shown in FIG. 10 that in the absence of the organoclay, the DGEBA/NMA formulation does not result in curing under the conditions used in this experiment. This provides further evidence that the organic component of the organoclay participates in the curing reaction.

Mechanical Properties of the Nanocomposite

The effect of molecular dispersion of the silicate layers on the viscoelastic properties of the crosslinked polymeric matrix was probed using DMA. This experiment involves applying an oscillatory strain to a sample while monitoring the resultant stress, which consists of both in-phase and out-of-phase components. These stresses can then be used to calculate the in-phase (E') and out-of-phase (E") components of the modulus. The ratio $E''/E' = \tan \delta$ is a measure of the ratio of energy lost to energy stored per cycle of deformation, and typically goes through a maximum at the glass transition ($T_s$) of the polymer. At $T_s$ there is a substantial drop in E, with a peak in tan δ indicating viscous damping due to segmental motion in the polymer. For crosslinked polymers, both E" and $T_s$ generally increase with crosslink density.

Figure 11:
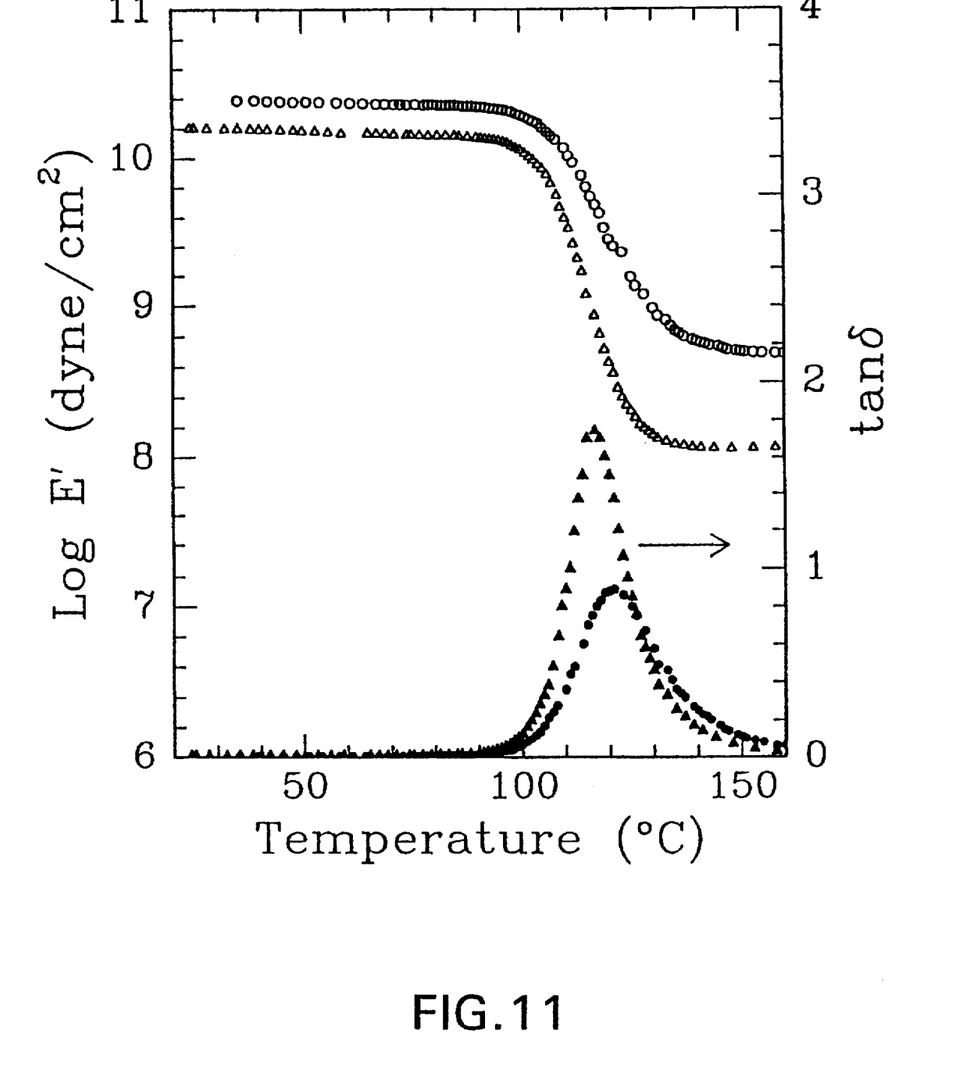
FIG. 11 depicts temperature dependence of E' (open symbols) and tan δ (shaded symbols) for fully cured DGEBA/BDMA (Δ,▲) and organoclay/DGEBA/BDMA (○,●) containing 4% MTS by volume.

Shown in FIG. 11 are the temperature dependencies of the tensile storage modulus, E', and tan δ of the organoclay/DGEBA/BDMA composite containing 4% silicate by volume, and the DGEBA/BDMA epoxy without any silicate. The shift and broadening of the tan δ peak to higher temperatures indicates an increase in nanocomposite $T_s$ and broadening of the glass transition. The shift in $T_s$ as measured by the tan δ peak maximum is on the order of only a few degrees (4° C. for the sample shown in FIG. 11) and cannot account for the significant increase in plateau modulus. Furthermore, since the extent of curing is comparable in both samples (as measured by DSC), the increase cannot be attributed to variations in curing. Broadening and increase of $T_s$ have been observed in other organic-inorganic nanocomposites and are generally attributed to restricted segmental motions near the organic-inorganic interface. Chemical bonding at the interface of the silicate and epoxy matrix could lead to hindered relaxational mobility in the polymer segments near the interface, which leads to broadening and increase of $T_s$.

Below $T_s$, both samples exhibit high storage modulus, with a slight decrease in E' with increasing temperature. Notably, E' in the glassy region below $T_s$ is approximately 58% higher in the nanocomposite compared to the pure (4)

epoxy (2.44 $10^{10}$ compared to 1.55 $10^{10}$ dyne/cm$^2$ at 40° C.). Even more striking is the large increase in E' at the rubbery plateau of the nanocomposite as shown in FIG. 11. The nanocomposite exhibits a plateau modulus approximately 4.5 times higher than the unmodified epoxy (5.0 $10^8$ compared to 1.1 $10^8$ dyne/cm$^2$ at 150° C.). These changes are considerable, particularly in view of the fact that the silicate content is only 4% by volume. In this context, it is interesting to compare these results with reports of viscoelastic properties of conventionally prepared epoxy composites containing micron or larger size filler particles. Typically, the conventional filled epoxies do not exhibit substantial changes in E' at the filler volume contents (<10%) used in this study.

Theoretical expressions have been derived by Halpin and Tsai (Halpin, J. C.; Kardos, J. L. Polym. Eng. Sci. 1976, 16, 344) to calculate elastic modulus of a composite consisting of uniaxially oriented particles of filler suspended in a continuous matrix. For composites with platelike particles, these equations predict a strong dependence of composite elastic modulus on filler aspect ratio. Solving the simultaneous Halpin-Tsai equations with the experimental dynamic storage modulus data in the glassy and the rubbery region yielded an apparent aspect ratio of 43. It is clear from the TEM micrographs shown in FIG. 7 that some relatively unmodified epoxy matrix exists between the domains of 5–10 delaminated silicate layers. As a result, the effective aspect ratio of the silicate-rich domains could be much lower than the 100–1000 predicted for fully delaminated and dispersed silicate layers.

While the present invention has been particularly set forth in terms of specific embodiments thereof, it will be understood in view of the present disclosure, that numerous variations upon the invention are now enable to those skilled in the art, which variations yet reside within the scope of the instant teachings. Accordingly, the invention is to be broadly construed, and limited only by the scope and the spirit of the claims now appended hereto.

We claim:

1. A method for preparing an epoxy-smectite clay nanocomposite, comprising dispersing a smectite clay in a dry state into a liquid diglycidyl ether of bisphenol A (DGEBA) said smectite-type clay having been modified to an organoclay by ion exchange with an alkyl ammonium salt; the positive ion of the salt being of the form $^+NH_3R_1$, $^+NH_2R_2R_3$, $^+NHR_4R_5R_6$, or $^+NR_7R_8R_9R_{10}$, wherein $R_1$ through $R_{10}$ are organic radicals; and wherein $R_1$, at least one of $R_2$ and $R_3$, at least one of $R_4$, $R_5$, and $R_6$, and at least one of $R_7$, $R_8$, $R_9$ and $R_{10}$, contain a functional group capable of reacting and bonding with the epoxy upon crosslinking of same; wherein said dispersing step is sufficient to transform the initial mixture from opaque to semitransparent; and curing in the presence of a curing agent which both produces delamination of the organoclay and either cross-links the DGEBA in the presence of said organoclay, reacts directly with the organoclay, or catalyzes the crosslinking reaction between the organoclay and DGEBA, wherein said curing agent is selected from one or more members of the group consisting of nadic methyl anhydride (NDA), benzyldimethylamine (BDMA) and boron trifluoride monoethylamine (BTFA).

2. A method in accordance with claim 1, wherein said functional group is selected from one or more members of the group consisting of hydroxyl, epoxy, and carboxylic groups.

3. A method in accordance with claim 1, wherein said ammonium salt has at least one alkyl ammonium chain having a terminal hydroxyl group.

4. A method in accordance with claim 1, wherein said ammonium salt comprises a bis (2-hydroxyethyl) methyl tallow alkyl ammonium salt.

5. A method in accordance with claim 1, wherein said smectite clay comprises a montmorillonite.

6. A method in accordance with claim 1, wherein said curing agent is capable of catalyzing the homopolymerization of DGEBA and catalyzing the reaction between said organoclay terminal hydroxyl group and the oxirane rings of said DGEBA.

7. A method in accordance with claim 6, wherein said curing agent comprises BDMA.

8. A method in accordance with claim 1, wherein said quaternary ammonium salt comprises a bis (2-hydroxyethyl) methyl tallow alkyl ammonium salt.

9. A method in accordance with claim 1, in which said curing is conducted at temperatures in the range of 100° to 200° C.

10. A method in accordance with claim 1, wherein dispersing of the dry smectite in the epoxy resin is carried out by mixing the smectite and DGEBA at temperatures in the range of 20° to 150° C., following by sonification.

* * * * *

UNITED STATES PATENT AND TRADEMARK OFFICE
CERTIFICATE OF CORRECTION

PATENT NO. : 5,554,670
DATED : September 10, 1996
INVENTOR(S) : Emmanuel P. Giannelis et al.

It is certified that error appears in the above-indentified patent and that said Letters Patent is hereby corrected as shown below:

Column 1, line 5,

"This invention was made with government support under Contract No. F49620-92-J-0132 awarded by the Air Force Office of Scientific Research. The government has certain rights in the invention."

Signed and Sealed this

Tenth Day of December, 1996

*Attest:*

BRUCE LEHMAN

*Attesting Officer*     *Commissioner of Patents and Trademarks*